(12) United States Patent
Seo et al.

(10) Patent No.: US 8,830,401 B2
(45) Date of Patent: Sep. 9, 2014

(54) METHOD AND APPARATUS FOR PRODUCING VIDEO

(71) Applicant: RSupport Co., Ltd., Seoul (KR)

(72) Inventors: Hyung Su Seo, Gyeonggi-do (KR); Jun Hyuk Kwak, Seoul (KR)

(73) Assignee: RSupport Co., Ltd, Seoul (KR)

( * ) Notice: Subject to any disclaimer, the term of this patent is extended or adjusted under 35 U.S.C. 154(b) by 0 days.

(21) Appl. No.: 13/935,377

(22) Filed: Jul. 3, 2013

(65) Prior Publication Data

US 2014/0009681 A1 Jan. 9, 2014

(30) Foreign Application Priority Data

Jul. 3, 2012 (KR) .................. 10-2012-0072399

(51) Int. Cl.
| | |
|---|---|
| *H04N 9/475* | (2006.01) |
| *H04N 5/445* | (2011.01) |
| *H04N 9/74* | (2006.01) |
| *H04N 9/76* | (2006.01) |
| *H04N 5/45* | (2011.01) |
| *H04N 5/262* | (2006.01) |

(52) U.S. Cl.
CPC . *H04N 5/45* (2013.01); *H04N 5/262* (2013.01)
USPC ........... 348/565; 348/512; 348/515; 348/563; 348/584; 348/598

(58) Field of Classification Search
CPC ........... H04N 5/04; H04N 5/45; H04N 5/265; H04N 5/445; H04N 5/262; H04N 5/44504; H04N 21/4305; H04N 21/4307; H04N 21/4341; H04N 21/8455; H04N 21/8547
USPC .......... 348/512, 515, 516, 564, 565, 584, 598
See application file for complete search history.

(56) References Cited

U.S. PATENT DOCUMENTS 5,251,015 A * 10/1993 Rumreich ............... 348/506
5,576,769 A * 11/1996 Lendaro ................. 348/511
(Continued)

FOREIGN PATENT DOCUMENTS

| KP | 1019990055332 A | 7/1999 |
|---|---|---|
| KP | 1020040082037 A | 9/2004 |

(Continued)

OTHER PUBLICATIONS

English Abstract for Korean Patent Application Publication No. 10 2004 0082037 A (2 pages).

(Continued)

*Primary Examiner* — Brian Yenke
(74) *Attorney, Agent, or Firm* — Osha Liang LLP (57) ABSTRACT

A method and apparatus for producing video are provided. The method includes: determining a reference time used as a reference for producing a PIP video; determining a first task time at which to acquire the first image, a second task time at which to acquire the second image, and a third task time at which to acquire the audio; acquiring the first image, the second image, and the audio at the respective task times; and combining the first image, the second image, and the audio according to a result of comparing the reference time and each of the task times, and producing the PIP video. Accordingly, a time and cost for producing the PIP video can be remarkably reduced.

5 Claims, 6 Drawing Sheets

(56) References Cited

U.S. PATENT DOCUMENTS

| | | | |
|---|---|---|---|
| 5,675,511 A * | 10/1997 | Prasad et al. | 715/203 |
| 5,914,757 A * | 6/1999 | Dean et al. | 348/584 |
| 6,154,600 A * | 11/2000 | Newman et al. | 386/281 |
| 6,192,511 B1 * | 2/2001 | Johnston et al. | 717/109 |
| 6,229,573 B1 * | 5/2001 | Sato et al. | 348/516 |
| 6,307,597 B1 * | 10/2001 | Patton et al. | 348/565 |
| 6,378,132 B1 * | 4/2002 | Grandin et al. | 725/146 |
| 6,392,672 B1 * | 5/2002 | Kulik | 715/781 |
| 6,493,872 B1 * | 12/2002 | Rangan et al. | 725/32 |
| 6,512,552 B1 * | 1/2003 | Subramanian | 348/564 |
| 6,556,252 B1 * | 4/2003 | Kim | 348/565 |
| 6,857,119 B1 * | 2/2005 | Desai | 717/145 |
| 7,006,152 B2 * | 2/2006 | Demas et al. | 348/565 |
| 7,071,993 B2 * | 7/2006 | Kim | 348/465 |
| 7,230,652 B2 * | 6/2007 | Demas et al. | 348/512 |
| 7,448,021 B1 * | 11/2008 | Lamkin et al. | 717/115 |
| 7,471,337 B2 * | 12/2008 | Wells et al. | 348/515 |
| 7,526,673 B2 * | 4/2009 | Inoue et al. | 714/11 |
| 7,546,576 B2 * | 6/2009 | Egli | 717/106 |
| 7,667,774 B2 * | 2/2010 | Murakami | 348/500 |
| 7,716,686 B1 * | 5/2010 | Dalcher et al. | 719/328 |
| 7,826,715 B2 | 11/2010 | Park et al. | |
| 7,843,510 B1 * | 11/2010 | Ayer et al. | 348/584 |
| 7,843,511 B2 * | 11/2010 | Kang et al. | 348/584 |
| 7,848,930 B2 * | 12/2010 | Luu | 704/500 |
| 7,904,886 B2 * | 3/2011 | Dufour et al. | 717/124 |
| 7,920,208 B2 * | 4/2011 | Maracic et al. | 348/473 |
| 7,996,750 B2 * | 8/2011 | Wang et al. | 714/798 |
| 8,194,756 B2 * | 6/2012 | Quigley et al. | 375/240.26 |
| 8,446,527 B2 * | 5/2013 | Bridges et al. | 348/548 |
| 2003/0050989 A1 * | 3/2003 | Marinescu et al. | 709/208 |
| 2004/0019885 A1 * | 1/2004 | Mandava et al. | 717/158 |
| 2004/0105012 A1 * | 6/2004 | Lee | 348/220.1 |
| 2004/0155982 A1 * | 8/2004 | Jeong | 348/565 |
| 2006/0044469 A1 * | 3/2006 | Kim et al. | 348/515 |
| 2007/0025696 A1 | 2/2007 | Kim et al. | |
| 2008/0267588 A1 * | 10/2008 | Iwase et al. | 386/108 |
| 2010/0194845 A1 | 8/2010 | Cho et al. | |
| 2011/0044602 A1 * | 2/2011 | Lim et al. | 386/224 |
| 2011/0188580 A1 * | 8/2011 | Valmiki et al. | 375/240.24 |
| 2012/0051713 A1 * | 3/2012 | Myung | 386/225 |
| 2012/0233692 A1 * | 9/2012 | Oh et al. | 726/22 |

FOREIGN PATENT DOCUMENTS

| | | |
|---|---|---|
| KP | 20070019511 A | 1/2007 |
| KP | 20100089287 A | 4/2010 |
| KP | 1020120007763 A | 1/2012 |
| KR | 20020011728 A | 2/2002 |
| KR | 20070014945 A | 2/2007 |
| WO | 2004109467 A2 | 12/2004 |

OTHER PUBLICATIONS

English Abstract for Korean Patent Application Publication No. 10-1999-0055332 A (2 pages).

English Abstract for Korean Patent Application Publication No. 10-2012-0007763 A (2 pages).

English Abstract for Korean Publication No. 10-2002-0011728, published Feb. 9, 2002 (1 page).

English Abstract for Korean Publication No. 10-2007-0019511, published on Feb. 15, 2007 (1 page).

* cited by examiner

METHOD AND APPARATUS FOR PRODUCING VIDEO

CLAIM FOR PRIORITY

This application claims priority to Korean Patent Application No. 10-2012-0072399 filed on Jul. 3, 2012 in the Korean Intellectual Property Office (KIPO), the entire contents of which are hereby incorporated by reference.

BACKGROUND

1. Technical Field

Example embodiments of the present invention relate in general to technology for producing a video, and more specifically, to a method and apparatus for producing a Picture-In-Picture (PIP) video.

2. Related Art

A Picture-In-Picture (PIP) video is a video in which one video is included in another main video. In order to produce the PIP video, an additional editing process has to be performed to produce two videos as one PIP video.

Since this video editing process is a task of producing one PIP video by editing each of two videos, there are problems in that the two videos included in the produced PIP video may not be synchronized, and it takes much time to produce the PIP video including the two videos which are synchronized.

SUMMARY

Accordingly, example embodiments of the present invention are provided to substantially obviate one or more problems due to limitations and disadvantages of the related art.

Example embodiments of the present invention provide a video production method that can easily synchronize two videos included in a PIP video.

Example embodiments of the present invention also provide a video production apparatus that can easily synchronize two videos included in a PIP video.

In some example embodiments, a video production method performed in a video production apparatus includes: determining a reference time used as a reference for producing a PIP video based on a first image produced by a program executed in the apparatus, a second image produced by a camera, and audio; determining a first task time at which to acquire the first image, a second task time at which to acquire the second image, and a third task time at which to acquire the audio; acquiring the first image, the second image, and the audio at the respective task times; and combining the first image, the second image, and the audio according to a result of comparing the reference time and each of the task times, and producing the PIP video.

The acquiring of the first image, the second image, and the audio at the respective task times may include: detecting a starting point of an update function that updates an image located in a buffer of a program platform; inserting a hooking code for hooking the image located in the buffer of the program platform into the starting point of the hooking code; and acquiring the hooked image using the hooking code as the first image.

The combining of the first image, the second image, and the audio according to the result of comparing the reference time and each of the task times, and producing the PIP video, may include: calculating intervals between the reference time and each of the task times; and when the calculated intervals are less than an interval between frames of the PIP video, combining the first image, the second image, and the audio, and producing one frame of the PIP video.

In other example embodiments, a video production method performed in a video production apparatus includes: determining a reference time used as a reference for producing a PIP video based on a first image produced by a program executed in a terminal, a second image produced by a camera, and audio; determining a first task time at which to acquire the first image, a second task time at which to acquire the second image, and a third task time at which to acquire the audio; acquiring the first image, the second image, and the audio at the respective task times; and combining the first image, the second image, and the audio according to a result of comparing the reference time and each of the task times, and producing the PIP video, wherein acquiring the first image, the second image, and the audio at the respective task times includes requesting transmission of the first image to the terminal, and acquiring the first image from the terminal according to the transmission request.

The combining of the first image, the second image, and the audio according to the result of comparing the reference time and each of the task times, and producing the PIP video, may include: calculating intervals between the reference time and each of the task times; and when the calculated intervals are less than an interval between frames of the PIP video, combining the first image, the second image, and the audio, and producing one frame of the PIP video.

In still other example embodiments, a video production apparatus includes: a determining portion configured to determine a reference time used as a reference for producing a PIP video based on a first image produced by a program executed in the apparatus, a second image produced by a camera, and audio; a first acquiring portion configured to determine a first task time at which to acquire the first image and to acquire the first image at the first task time, a second acquiring portion configured to determine a second task time at which to acquire the second image and to acquire the second image at the second task time, a third acquiring portion configured to determine a third task time at which to acquire the audio and to acquire the audio at the third task time, and a producing portion configured to combine the first image, the second image, and the audio according to a result of comparing the reference time and each of the task times, and to produce the PIP video.

The first acquiring portion may detect a starting point of an update function that updates an image located in a buffer of a program platform, insert a hooking code for hooking the image located in the buffer of the program platform into the starting point of the hooking code, and acquire the hooked image using the hooking code as the first image.

The producing portion may calculate intervals between the reference time and each of the task times, when the calculated intervals are less than an interval between frames of the PIP video, combine the first image, the second image, and the audio, and produce one frame of the PIP video.

BRIEF DESCRIPTION OF DRAWINGS

Example embodiments of the present invention will become more apparent by describing in detail example embodiments of the present invention with reference to the accompanying drawings, in which.

DETAILED DESCRIPTION

Example embodiments of the present invention are disclosed herein. However, specific structural and functional details disclosed herein are merely representative for purposes of describing example embodiments of the present invention, however, example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Figure 1:
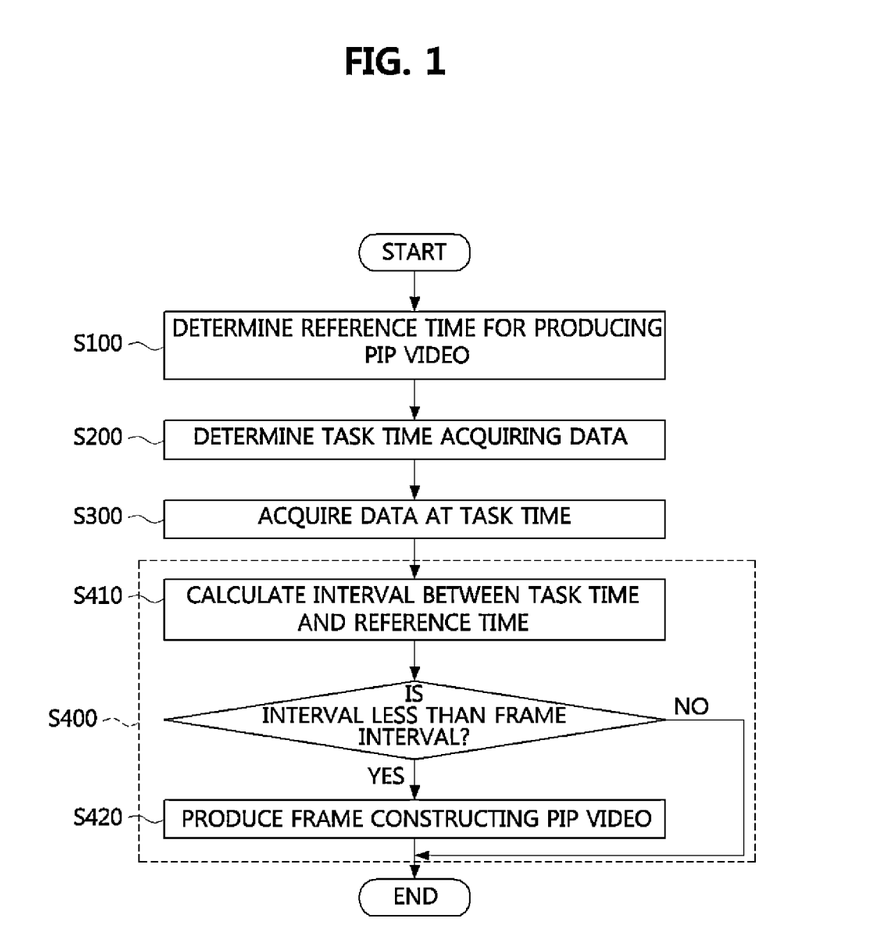
FIG. 1 is a flowchart showing a video production method according to one exemplary embodiment of the present invention.

FIG. 1 is a flowchart showing a video production method according to one exemplary embodiment of the present invention.

Referring to FIG. 1, a method of producing video may include determining a reference time used as a reference for producing a PIP video based on a first image which is produced by a program executed in a video production apparatus (not shown), a second image which is produced by a camera (not shown), and audio (S100). Further, the method may include storing the determined reference time in a database which is included in the video production apparatus.

Here, the apparatus may be a desktop computer, a laptop computer, a tablet PC, a wireless phone, a mobile phone, a smart phone, an e-book reader, and so on.

Further, the program executed in the video production apparatus may include a game, a web browser, various applications, and so on. And the first image produced by the program executed in the video production apparatus may mean an image displayed by running the game, an image displayed by running the web browser, and images displayed by running the various applications.

Here, the camera may be included in the video production apparatus. In the case of using a computer as the video production apparatus, the camera may mean a video camera which is included in the computer. In the case of using the mobile terminal as the video production apparatus, the camera may mean a camera which is included in the mobile terminal. Alternatively, the camera may be additional to the video production apparatus. In this case, the camera may be connected to the video production apparatus with a cord or wirelessly in order to transmit data. The second image produced by the camera may mean an image taken by the camera.

Here, the audio may mean audio produced by the video production apparatus producing the first image, and audio input through a microphone included in the video production apparatus or the camera.

Here, the reference time used as the reference for producing the PIP video may mean a time used as a reference for synchronization of the first image, the second image, and the audio which are individually acquired.

After determining the reference time used as the reference for producing the PIP video, the method of producing the video may include determining a first task time for acquiring the first image, a second task time for acquiring the second image, and a third task time for acquiring the audio (S200). Further, the method may include storing the determined first task time, second task time, and third task time in the database included in the video production apparatus.

In the video production method according to one exemplary embodiment of the present invention, since a task of acquiring the first image, a task of acquiring the second image, and a task of acquiring the audio may be performed separately, it may be necessary to define a reference time for each of the tasks in order to synchronize the first image, the second image, and the audio, which are separately acquired.

Accordingly, the video production method may involve determining a reference time of the task of acquiring the first image as the first task time, a reference time of the task of acquiring the second image as the second task time, and a reference time of the task of acquiring the audio as the third task time.

Here, the video production method may involve differently determining the first task time, the second task time, and the third task time according to characteristics of the tasks. For example, when the time producing the first image and the second image are different from each other, the video production method may involve differently determining the first task time used as the reference for acquiring the first image and the second task time used as the reference for acquiring the second image.

After differently determining the first task time, the second task time, and the third task time, the video production method may include acquiring the first image at the first task time, the second image at the second task time, and the audio at the third task time (S300). Further, the acquired first image, second image, and audio may be stored in the database which is included in the video production apparatus. At this time, the video production apparatus may perform the tasks of acquiring the first image, acquiring the second image, and acquiring the audio, in parallel.

Step S300 may include steps S310, S311, S312, and S313, or only steps S311, S312, and S313. Step S300 will be explained with reference to FIG. 2 below.

Figure 2:
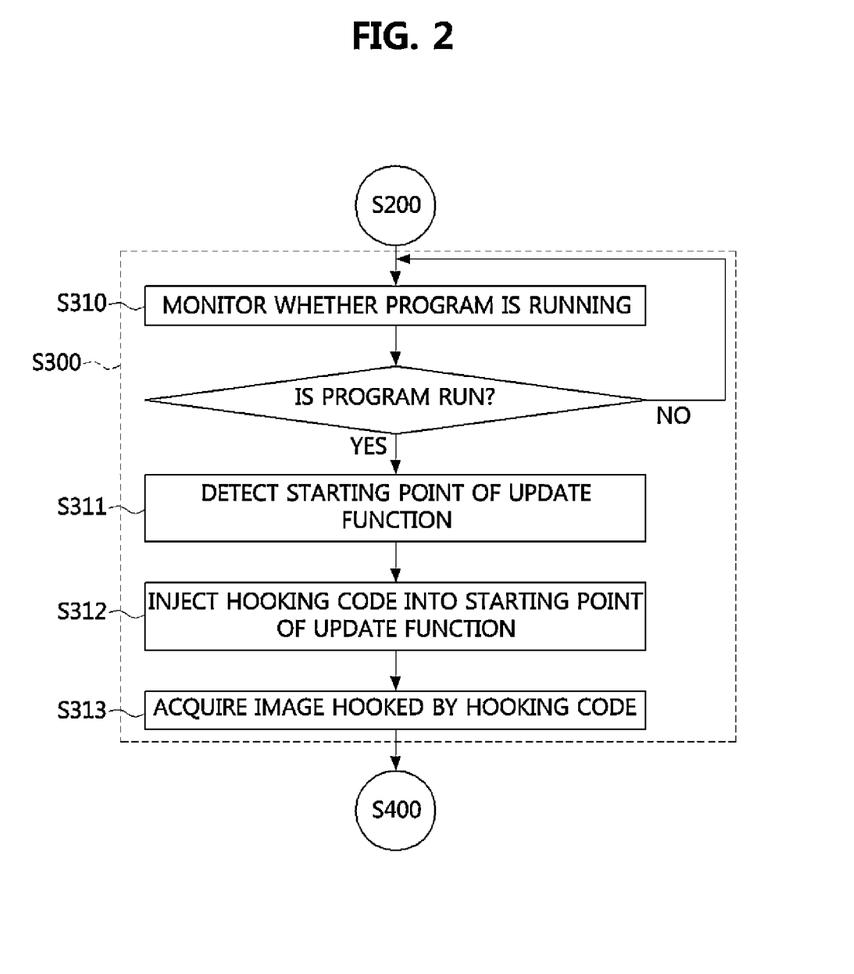
FIG. 2 is a flowchart showing a step of acquiring data of FIG. 1.

FIG. 2 is a flowchart showing a step of acquiring data shown in FIG. 1.

Referring to FIG. 2, the video production method may include monitoring whether the program (for example, a game program, etc.), which is a source for acquiring the first image, is running in the video production apparatus (S310). Here, it may be monitored whether the program is running in the video production apparatus by using a hooking module which is previously installed.

For example, when the program which is the source for acquiring the first image is the game program, the video production method may include determining whether the program currently running uses a game library. Here, when the program currently running uses the game library, the program may be determined to be the game program, and when the program currently running does not use the game library, the program may be determined to be a general program.

In the video production method according to one exemplary embodiment of the present invention, S310 may be omitted.

The video production method may include detecting a starting point of an update function that updates an image located in a buffer of a program platform (S311).

Here, the update function may mean a function performing the role of updating the image located in the buffer of the program platform with a new image, in the case of hooking the update function, the update function may acquire the image located in the buffer of the program platform.

Accordingly, in order to acquire the image located in the buffer of the program platform, the video production method may involve detecting the starting point of the update function that updates the image, and storing the starting point of the update function in the database included in the video production apparatus.

In the case of detecting the starting point of the update function, the video production method may include inserting a hooking code for hooking the image located in the buffer of the program platform into the starting point of the update function (S312), and acquiring a hooked image (that is, a first image) using the hooking code (S313).

Steps S312 and S313 will be explained in detail with reference to FIG. 5 below

Figure 5:
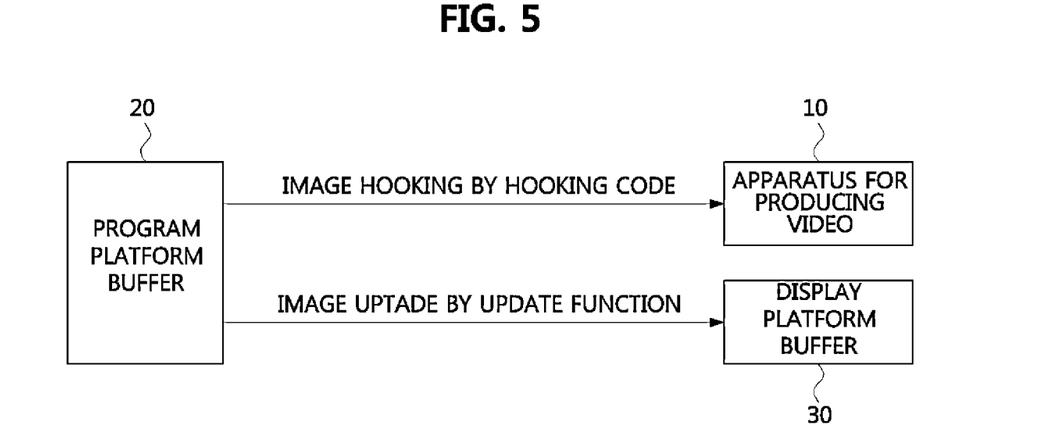
FIG. 5 is a conceptual diagram explaining a method of hooking an image according to an exemplary embodiment of the present invention.

FIG. 5 is a conceptual diagram showing an apparatus for hooking an image according to an exemplary embodiment of the present invention.

Referring to FIG. 5, generally, the update function may update the image located in a program platform buffer 20 with a new image, and provide the updated image to a display platform buffer 30. According to one exemplary embodiment of the present invention, in the case of inserting the hooking code at the starting point of the update function, the update function at which the hooking code is inserted may firstly provide the updated image not to the display platform buffer 30 but to an video production apparatus 10, and the video production apparatus 10 may acquire the image located in the program platform buffer 20 by operation of the update function at which the hooking code is inserted.

For example, when the program platform buffer 20 is a game program platform buffer, since game program platforms of DirectX/OpenGL etc. may be provided in Microsoft's Windows operating system, the video production apparatus 10 may acquire the image located in the program platform buffer 20 through the hooking operation.

After acquiring the image located in the program platform buffer 20, the video production apparatus 10 may recover the starting point of the update function at which the hooking code is inserted. That is, the video production apparatus 10 may remove the inserted hooking code and recover the starting point of the update function at which the hooking code is inserted. The update function whose starting point is recovered may provide the image located the program platform buffer 20 to the display platform buffer 30.

After the image located in the program platform buffer 20 by the recovered update function is provided to the display platform buffer 30, the video production apparatus 10 may determine whether there is an image to be acquired additionally. If there is an image that has to be acquired additionally, the above steps S311, S312, and S313 may be performed again, but, if there is no image to be acquired additionally, step S300 may be stopped.

As described above, the video production apparatus 10 may acquire not the image (that is, the image displayed on a screen) located in the display platform buffer 30, but the image located in the program platform buffer 20, thereby acquiring the image at high speed, and then producing the PIP video at high speed.

In order to acquire the second image produced by the camera, the video production method may include acquiring the second image by using a camera-related API (Application Program Interface) provided by the operating system (S300). For example, in the case of using the window as the operating system, the video production apparatus 10 may acquire the second image produced by the camera by using 'DirectShow', 'Video For Windows', and so on.

Through the above method, after acquiring the first image and the second image, the video production apparatus 10 may perform image processing such as normalization, threshold, and so on, for the first image and the second image.

In order to acquire the audio, the video production method may include acquiring the audio by using an audio-related API provided by the operating system (S300). For example, in the case of using Microsoft Windows as the operating system, the audio may be acquired by using 'MCI (Media Control Interface)', 'DirectShow', 'WASAPI (Windows Audio Session API)', and so on.

After acquiring the first image, the second image, and the audio, the video production method may include producing the PIP video by combining the first image, the second image, and the audio, according to a result of comparing the reference time and the first task time, a result of comparing the reference time and the second task time, and a result of comparing the reference time and the third task time (S400).

First, the video production method may involve calculating an interval between the first task time and the reference time, an interval between the second task time and the reference time, and an interval between the third task time and the reference time (S410).

After calculating the intervals between each of the task times and the reference time, the intervals between each of the task times and the reference time may be compared with an interval between frames of the PIP video. Here, the interval between the frames may mean a time occupied by one frame, for example, in the case of the PIP video of 10 FPS (Frame Per Second), one frame takes 100 ms.

After comparing the intervals between each of the task time and the reference time with an interval between frames of the PIP video, when the intervals between each of the task times and the reference time are less than an interval between frames of the PIP video, the video production method may include producing one frame of the PIP video by combining the first image, the second image, and the audio (S420).

When the intervals between each of the task times and the reference time are greater than an interval between frames of the PIP video, the video production apparatus 10 may use corresponding data (the first image, the second image, and the audio) for producing a next frame. For example, in the case of satisfying 'the interval between the first task time and the reference time≤the interval between frames of the PIP video', 'the interval between the second task time and the reference time≤the interval between frames of the PIP video', and 'the interval between the third task time and the reference time≤the interval between frames of the PIP video', the video production apparatus 10 may produce a current frame by combining the first image and the audio, and use the second image in order to produce the next frame. Further, in this case, the video production apparatus 10 may produce the current frame by combining the first image, the audio, and the second image in order to produce the previous frame.

In the case of producing a frame of the PIP video by combining the first image, the second image, and the audio, the video production apparatus 10 may firstly combine the first image and the second image, and secondly combine the combination of the first image and the second image, and the audio.

In the case of combining the first image and the second image, the video production apparatus 10 may change resolutions of the first image and the second image, change a location of the second image on the first image, and adjust transparencies of the first image and the second image.

Further, the video production apparatus 10 may combine one first image and a plurality of second images. That is, the apparatus may produce one frame of the PIP video by combining one first image produced by one terminal and the plurality of second images produced by a plurality of cameras.

Through the above method, the produced PIP video may be displayed on a display device (for example, an LCD (Liquid Crystal Display), an LED (Light Emitting Diode) display, etc.).

Figure 3:
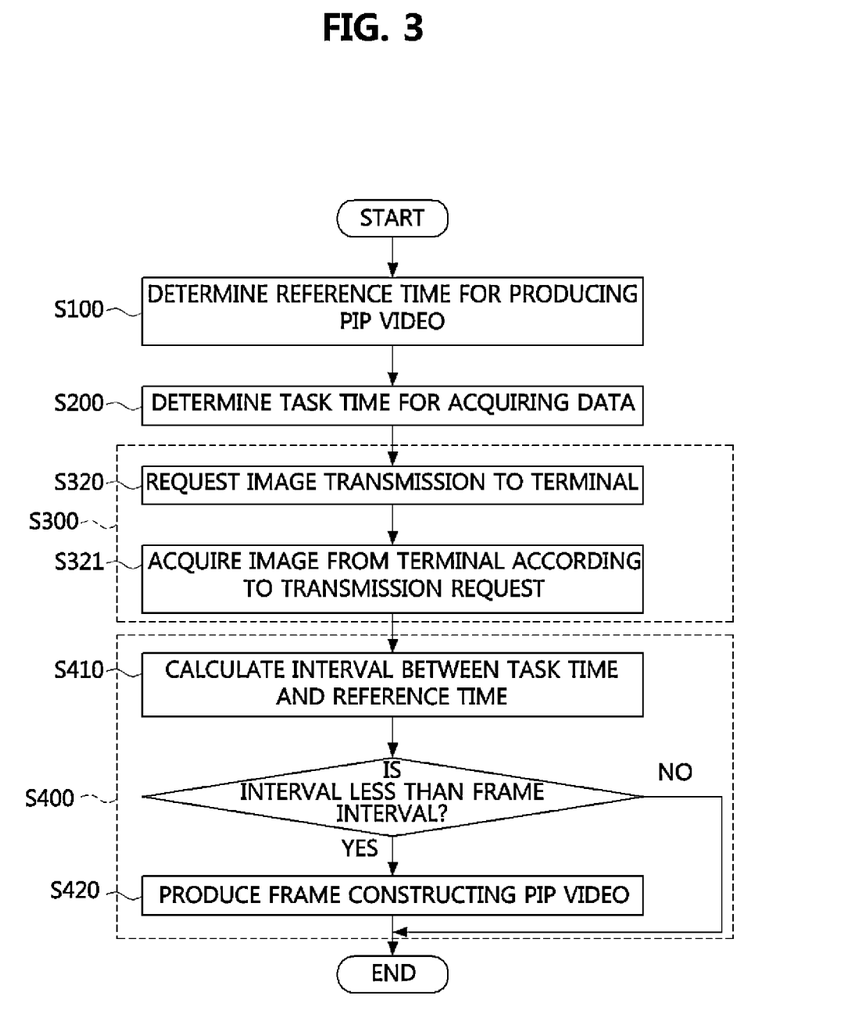
FIG. 3 is a flowchart showing a video production method according to another exemplary embodiment of the present invention.

FIG. 3 is a flowchart showing a video production method according to another exemplary embodiment of the present invention.

Referring to FIG. 3, a video production method performed in a video production apparatus may include determining a reference time used as a reference for producing a PIP image based on a first image produced by a program executed in a terminal, a second image produced in a camera, and audio (S100), determining a first task time at which to acquire the first image, a second task time at which to acquire the second image, and a third task time at which to acquire the audio (S200), acquiring the first image, the second image, and the audio at the respective task times (S300), and producing the PIP video by combining the first image, the second image, and the audio, according to a result of comparing the reference time and each of the task time (S400).

Here, the video production apparatus and the terminal may have constructions which are separate from each other, and the terminal may be a mobile terminal, such as a tablet PC or a smart phone.

When the video production apparatus and the terminal are separate, the video production apparatus and the terminal may form a wired or wireless network. When the network wireless, it may be a 2G mobile radio communication network (a GSM (Global System for Mobile communication) network, a CDMA (Code Division Multiple Access) network, etc.), a 3G mobile radio communication network (a WCDMA (Wideband Code Division Multiple Access) network, a CDMA2000 network, etc.), a 4G mobile radio communication network (an LTE (Long Term Evolution)-Advanced network, etc.), WiFi (Wireless Fidelity), and so on.

Here, a method performed in steps S100, S200, and S400 may be identical to the method performed in steps S100, S200, and S400 explained above with reference to FIG. 1.

In the case of acquiring the first image, the second image, and the audio at the respective task times, the method may involve requesting transmission of the first image to the terminal (S320). Further, the terminal from which transmission of the first image is requested may capture an image which is displayed on a screen. At this time, the terminal may capture the image displayed on the screen by using a general capture function.

Figure 7:
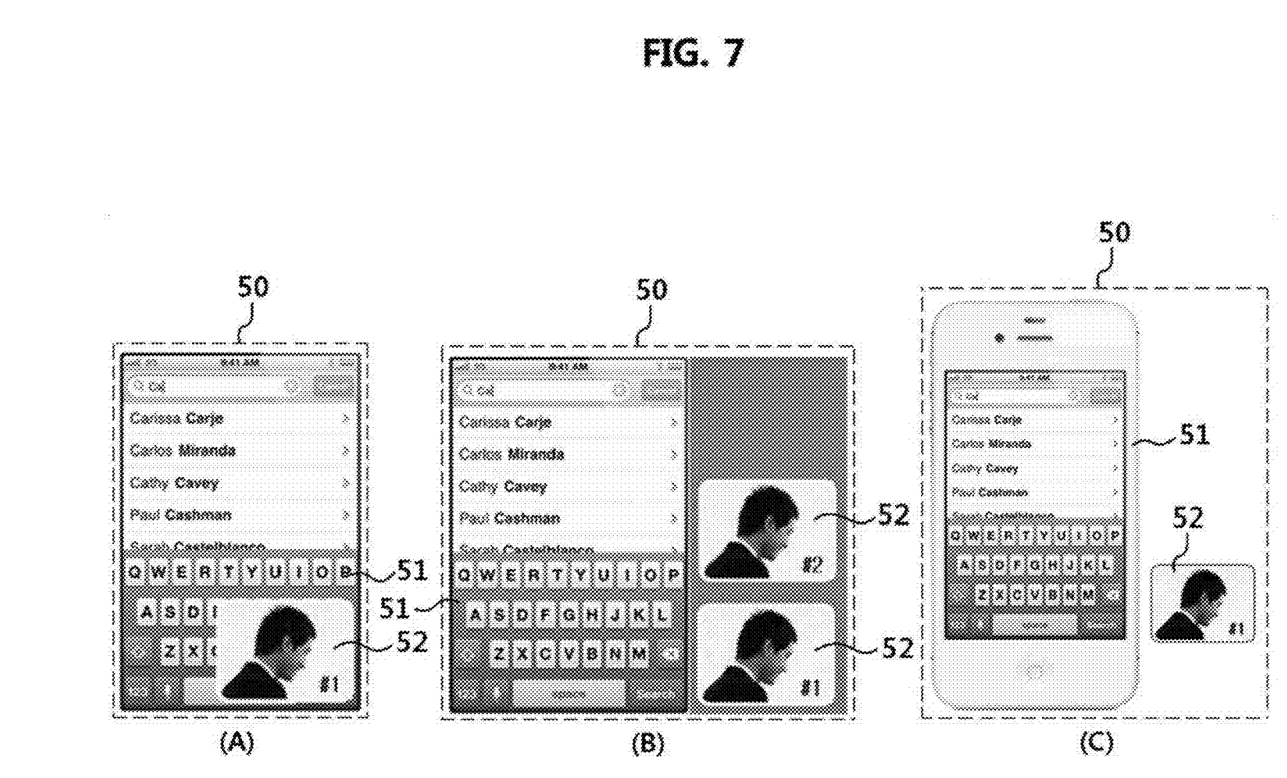
FIG. 7 is a conceptual diagram showing a PIP video according to another exemplary embodiment of the present invention.

After capturing the image displayed on the screen, the terminal may store the captured image in a buffer included in the terminal, and provide the image stored in the buffer to the video production apparatus. At this time, the terminal may provide only the image displayed on the screen to the video production apparatus, and provide a bezel of the terminal together with the image displayed on the screen to the video production apparatus (see FIG. 7(*c*)).

The video production method may involve acquiring the first image provided by the terminal according to the image transmission request (S321). After acquiring the first image, the video production method may include further determining whether the first image is to be additionally acquired. When the first image is to be additionally acquired, steps S320 and S321 may be performed, and when the first image is not to be additionally acquired, the method may stop at step S300.

Figure 4:
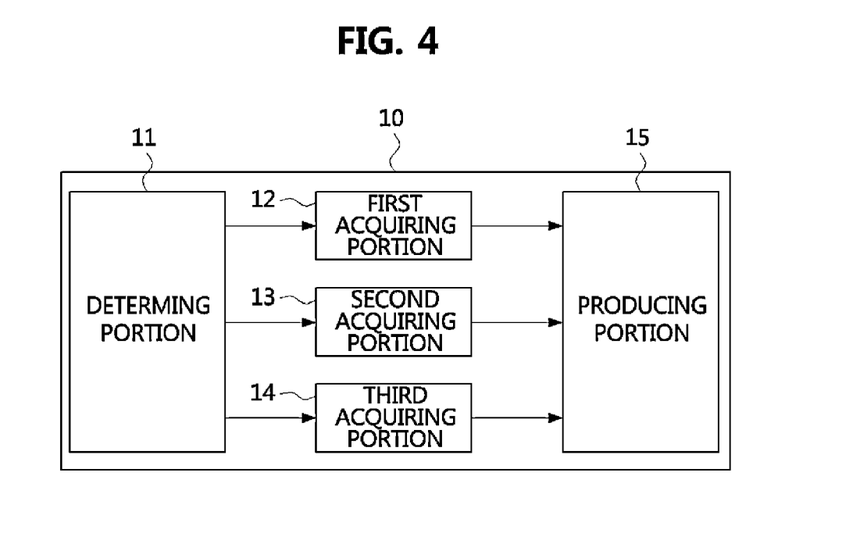
FIG. 4 is a block diagram showing a video production apparatus according to one embodiment of the present invention.

FIG. 4 is a block diagram showing a video production apparatus according to one embodiment of the present invention.

Referring to FIG. 4, the video production apparatus 10 may include a determining portion 11, a first acquiring portion 12, a second acquiring portion 13, a third acquiring portion 14, and a producing portion 15.

The determining portion 11 may determine a reference time used as a reference for producing a PIP video based on a first image which is produced by a program executed in the video production apparatus, a second image which is produced by a camera, and audio. Here, the determining portion 11 may perform the same function as described above with reference to step S100.

The first acquiring portion 12 may determine a first task time at which to acquire the first image, and acquire the first image at the first task time.

In detail, the first acquiring portion 12 may monitor whether the program is running in the video production apparatus, and if the program is running, detect a starting point of an update function that updates an image located in a program platform buffer, insert a hooking code for hooking the image located in the program platform buffer at the starting point of the update function, and acquire a hooked image (that is, the first image) using the hooking code. Here, the first acquiring portion 12 may perform the same functions as described above with reference to steps S200 and S300 shown in FIGS. 1 and 2.

The second acquiring portion 13 may determine a second task time at which to acquire the second image, and acquire the second image at the second task time. Here, the second acquiring portion 13 may perform the same functions as described above with reference to steps S200 and S300 shown in FIG. 1.

The third acquiring portion 14 may determine a third task time at which to acquire the audio, and acquire the audio at the third task time. Here, the third acquiring portion 14 may perform the same functions as described above with reference to steps S200 and S300 shown in FIG. 1.

The producing portion 15 may produce a PIP video by combining the first image, the second image, and the audio, according to a result of comparing the reference time and each of the task times.

In detail, the producing portion 15 may calculate intervals between each of the task time and the reference time, if each of the calculated intervals is less than an interval between frames constituting the PIP video, and produce one frame constituting the PIP video by combining the first image, the second image, and the audio. Here, the producing portion 15 may perform the same function as described above with reference to step S400 shown in FIG. 1.

The functions performed by the determining portion 11, the first acquiring portion 12, the second acquiring portion 13, the third acquiring portion 14, and the producing portion 15 may be actually performed in a processor (for example, CPU (Central Processing Unit) and/or GPU (Graphics Processing Unit), etc.), and each of the steps shown in FIGS. 1, 2, and 3 may be performed in the processor.

Further, the determining portion 11, the first acquiring portion 12, the second acquiring portion 13, the third acquiring portion 14, and the producing portion 15 may be implemented as a single type, a single physical apparatus, or a single module. Moreover, the determining portion 11, the first acquiring portion 12, the second acquiring portion 13, the third acquiring portion 14, and the producing portion 15 may be implemented as an individual physical apparatus, a plurality of physical apparatuses, or a group.

Further, the video production apparatus 10 may include the buffer in which an image is stored.

Figure 6:
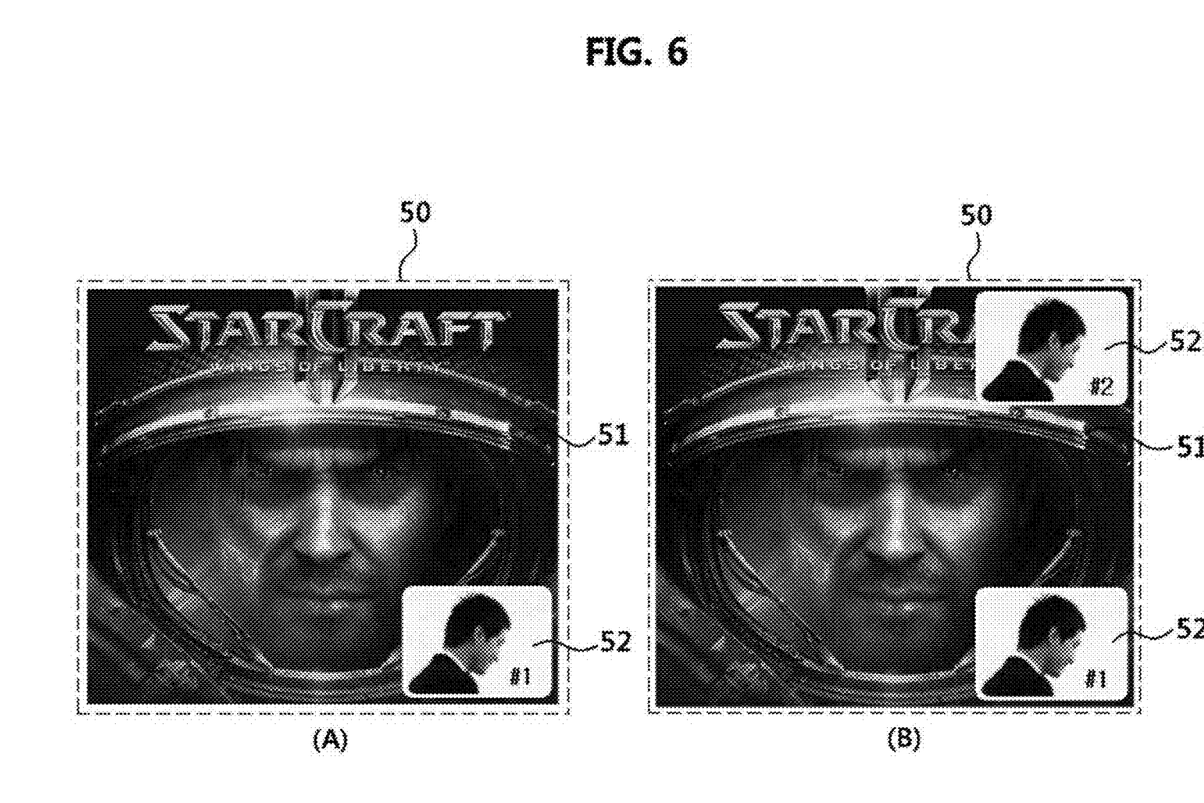
FIG. 6 is a conceptual diagram showing a PIP video according to one exemplary embodiment of the present invention.

FIG. 6 is a conceptual diagram showing a PIP video according to one exemplary embodiment of the present invention.

FIG. 6(a) illustrates a PIP video 50 produced based on a first image 51 produced by a game program and a second image 52 produced by a camera, and the second image 52 is included within the first image 51.

FIG. 6(b) illustrates a PIP video 50 produced based on the first image 51 produced by the game program and the two second images 52 produced respectively by two cameras, and the two second images 52 are included within the first image 51.

FIG. 7 is a conceptual diagram showing a PIP video according to another exemplary embodiment of the present invention.

FIG. 7(a) illustrates a PIP video 50 produced based on the first image 51 produced by a mobile terminal and the second image 52 produced by a camera, and the second image 52 is included within the first image 51.

FIG. 7(b) illustrates a PIP video 50 produced based on the first image 51 produced by a mobile terminal and the two second images 52 produced respectively by two cameras, and the two second images 52 are located outside the first image 51.

FIG. 7(c) illustrates a PIP video 50 produced based on the first image 51 produced by a mobile terminal and two second images 52 produced respectively by two cameras, and the two second images 52 are located outside the first image 51, and the first image 51 includes not only the image displayed on a screen of the mobile terminal but also a bezel of the mobile terminal.

While example embodiments of the present invention and their advantages have been described in detail, it should be understood that various changes, substitutions and alterations may be made herein without departing from the scope of the invention.

What is claimed is:

1. A video production method performed in a video production apparatus, the method comprising:
   determining a reference time used as a reference for producing a PIP video based on a first image produced by a program executed in the apparatus, a second image produced by a camera, and audio;
   determining a first task time at which to acquire the first image, a second task time at which to acquire the second image, and a third task time at which to acquire the audio;
   acquiring the first image, the second image, and the audio at the respective task times; and
   combining at least one of the first image, the second image, and the audio according to the result of comparing the reference time and each of the task times to produce the PIP video,
   wherein combining at least one of the first image, the second image, and the audio comprises:
   calculating intervals between the reference time and each of the task times; and
   when the calculated intervals are less than an interval between frames of the PIP video, combining the first image, the second image, and the audio to produce a first frame of the PIP video,
   when at least one of the calculated intervals are more than an interval between frames of the PIP video, combining an image corresponding to the at least one of the calculated intervals to produce a second frame next to the first frame of the PIP video.

2. The method according to claim 1, wherein the acquiring of the first image, the second image, and the audio at the respective task times comprises:
   detecting a starting point of an update function that updates an image located in a buffer of a program platform;
   inserting a hooking code for hooking the image located in the buffer of the program platform into the starting point of the hooking code; and
   acquiring the hooked image using the hooking code as the first image.

3. A video production method performed in a video production apparatus, the method comprising:
   determining a reference time used as a reference for producing a PIP video based on a first image produced by a program executed in a terminal, a second image produced by a camera, and audio;
   determining a first task time at which to acquire the first image, a second task time at which to acquire the second image, and a third task time at which to acquire the audio;
   acquiring the first image, the second image, and the audio at the respective task times; and
   combining at least one of the first image, the second image, and the audio according to a result of comparing the reference time and each of the task times to produce the PIP video,
   wherein the acquiring of the first image, the second image, and the audio at the respective task times comprises:
      requesting transmission of the first image to the terminal; and
      acquiring the first image from the terminal according to the transmission request
   wherein combining at least one of the first image, the second image, and the audio comprises:
      calculating intervals between the reference time and each of the task times; and
      when the calculated intervals are less than an interval between frames of the PIP video, combining the first image the second image and the audio to produce a first frame of the PIP video,
      when at least one of the calculated intervals are more than an interval between frames of the PIP video, combining an image corresponding to the at least one of the calculated intervals to produce a second frame next to the first frame of the PIP video.

4. A video production apparatus, comprising:
   a determining portion configured to determine a reference time used as a reference for producing a PIP video based on a first image produced by a program executed in the apparatus, a second image produced by a camera, and audio;
   a first acquiring portion configured to determine a first task time at which to acquire the first image and to acquire the first image at the first task time;
   a second acquiring portion configured to determine a second task time at which to acquire the second image and to acquire the second image at the second task time;
   a third acquiring portion configured to determine a third task time at which to acquire the audio and to acquire the audio at the third task time; and
   a producing portion configured to combine the first image, the second image, and the audio according to a result of comparing the reference time and each of the task times, and to produce the PIP video,
   wherein the producing portion calculates intervals between the reference time and each of the task times, when the calculated intervals are less than an interval between frames of the PIP video, combines the first image, the second image, and the audio to produce a first frame of the PIP video, and when at least one of the calculated intervals are more than an interval between frames of the PIP video, combines an image corresponding to the at least one of the calculated intervals to produce a second frame next to the first frame of the PIP video.

5. The apparatus according to claim 4, wherein the first acquiring portion detects a starting point of an update function that updates an image located in a buffer of a program platform, inserts a hooking code for hooking the image located in the buffer of the program platform into the starting point of the hooking code, and acquires the hooked image using the hooking code as the first image.

* * * * *